United States Patent [19]
Uchiyama et al.

[11] 3,820,925
[45] June 28, 1974

[54] OIL SEAL DEVICE FOR ROTARY PISTON INTERNAL COMBUSTION ENGINE

[75] Inventors: Yoshio Uchiyama; Noriyuki Kurio, both of Hiroshima, Japan

[73] Assignee: Toyo Koygo Company Limited, Hiroshima, Japan

[22] Filed: Sept. 7, 1973

[21] Appl. No.: 395,117

Related U.S. Application Data

[63] Continuation-in-part of Ser. No. 267,723, June 29, 1972, abandoned.

[30] Foreign Application Priority Data
June 29, 1971  Japan.............................. 46-56727

[52] U.S. Cl. ............................................. 418/142
[51] Int. Cl. ... F01c 19/00, F04c 15/00, F04c 27/00
[58] Field of Search...................... 418/142; 277/160

[56] References Cited
UNITED STATES PATENTS
3,575,541  4/1971  Hamada............................ 418/142
3,650,536  3/1972  Shields............................. 277/93 SD Primary Examiner—Carlton R. Croyle
Assistant Examiner—John J. Vrablik
Attorney, Agent, or Firm—Sughrue, Rothwell, Mion, Zinn & Macpeak

[57] ABSTRACT

In rotary piston internal combustion engines comprising a center housing having a trochoidal inner peripheral surface, side housings provided at both sides of said center housing forming axial thrust surfaces and a three apexed rotary piston provided on an eccentric shaft within a casing formed by said center and side housing for rotation about the shaft axis. Oil seal devices having an annular oil seal ring and an O-ring and an annular oil seal groove and an annular spring are provided on the thrust surfaces of said rotary piston. Two portions of the spring secure itself elastically and the oil seal ring in the circumferential direction within the annular oil seal groove in order to prevent relative slippage between said piston and the oil seal ring within the groove.

9 Claims, 13 Drawing Figures

OIL SEAL DEVICE FOR ROTARY PISTON INTERNAL COMBUSTION ENGINE

CROSS REFERENCE TO A RELATED APPLICATION

This application is a continuation-in-part of application Ser. No. 267,723, filed June 29, 1972, and now abandoned.

BACKGROUND OF THE INVENTION

1. Field of the Invention

This invention relates to the improvement in an oil seal device for rotary piston internal combustion engines which is fitted on a thrust face of a rotary piston so as to maintain oil tightness between the thrust surfaces of the rotary piston and side housings. This invention especially relates to the improvement in an oil seal device which provides an auxiliary seal ring such as an O-ring at the outer or inner circumference of an annular oil seal ring so as to maintain the oil tightness between an oil seal groove and the oil seal ring.

2. DESCRIPTION OF THE PRIOR ART

This kind of oil seal device usually has the annular oil seal ring fitted in the oil seal groove only with a spring. Therefore, when the rotary piston revolutions are high or when the compressive stress of the usual annular oil seal ring against the thrust surface of the side housing is large because of the elastic force of the spring and the gas pressure, the annular oil seal ring cannot follow the piston's revolution and the relative slippage occurs between the annular oil seal ring and the oil seal groove, resulting in increased abrasion of the O-ring fitted in the outer or inner circumference of the annular seal ring and the sealing characteristic of the seal is reduced in a short period of time. Consequently, waste of oil and other bad influences upon the engine occur. The object of the present invention is to provide an oil seal device of a rotary piston internal combustion engine for settling the aforementioned disadvantages.

SUMMARY OF THE INVENTION

This invention is made by paying attention to the above point so that the relative slippage between the rotary piston and the annular oil seal ring is elastically prevented, by securing the two portions of the spring, in the circumferential direction, to the annular oil seal ring and the rotary piston, respectively.

Other objects and advantages will be apparent from the following detailed description taken in conjunction with the accompanying drawings.

DESCRIPTION OF THE PREFERRED EMBODIMENTS

Figure 1:
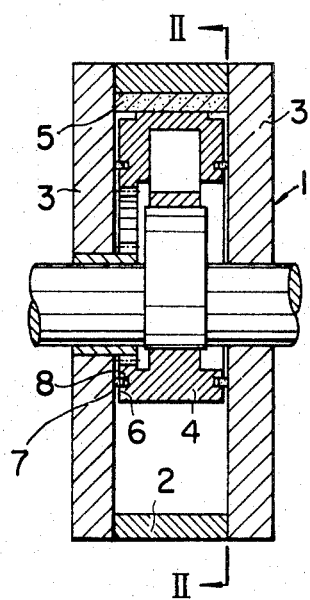
FIG. 1 is a side view of a vertical section of a rotary piston internal combustion engine provided with an oil seal device of this invention.
Figure 2:
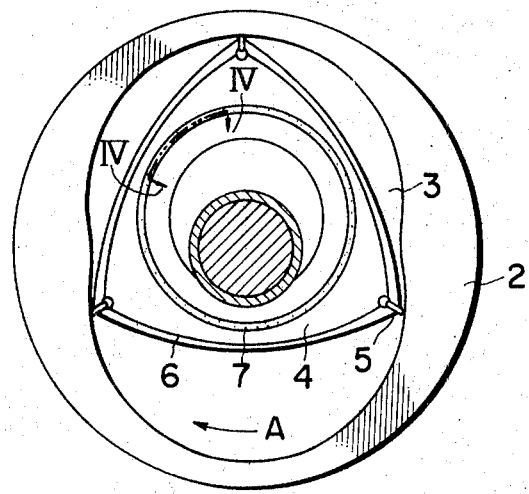
FIG. 2 is a front sectional view of the engine of FIG. 1 taken about line II—II.
Figure 3:
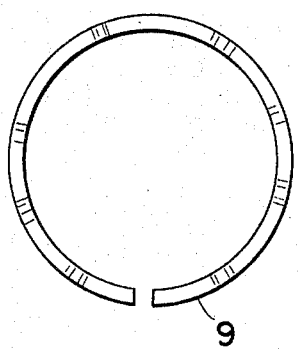
FIG. 3 is a front view of the spring.

The practical examples of this invention are explained according to the drawings as follows: A casing 1 consists of a center housing 2 and side housings 3 located at both sides of the center housing 2. A rotary piston 4 rotates planetarily inside the casing 1. The rotary piston 4 is triangular and an apex seal 5 is provided at each apex and an arc-shaped gas seal 6 and annular oil seal rings having a sliding face slidingly contacting the inner wall face of the side housing at the axially outer side thereof, are provided at both sides. The annular oil seal ring 7 fits by way of a spring 9 in each oil seal groove 8 so provided on the thrust surface of the rotary piston 4 as to be recessed in the axial inner direction of the rotary piston 4. The annular oil seal ring 7 is provided with an O-ring 10 inserted into its inner circumference. A fastening recess or radial slot 12 provided at an opposite face 11 to the sliding face of the oil seal ring 7 secures one end of the spring 9 in the circumferential direction. A similar fastening recess or radial slot 14 is provided at axially inner recessed face 13 of the oil seal groove 8 and the fastening recess 12 secure respective ends of the spring 9 in the circumferential direction so as to prevent the slippage of the annular oil seal ring 7 relative to the oil seal groove 8 in the circumferential direction. In order to prevent relative slippage of the oil seal ring relative to the oil seal groove 8 in the circumferential direction, it is enough only to secure the spring 9 at at least two places in the circumferential direction to the oil seal ring 7 and the oil seal groove 8 with the knock pin, respectively.

Figure 4:
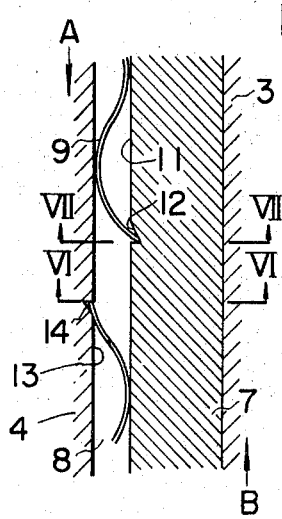
FIG. 4 is an expanded and enlarged side view of a IV—IV section of FIG. 2.
Figure 5:
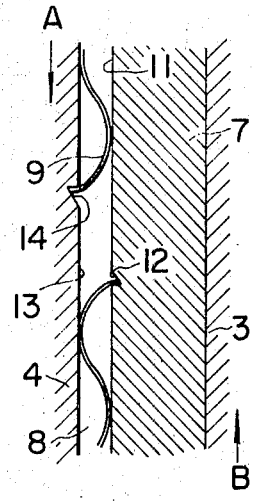
FIG. 5 is a view of another practical example of the invention corresponding to that of FIG. 4.
Figure 6:
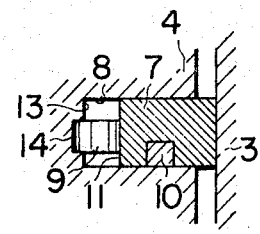
FIGS. 6 and 7 are side views of sections VI—VI and VII—VII of FIG. 4, respectively.
Figure 7:
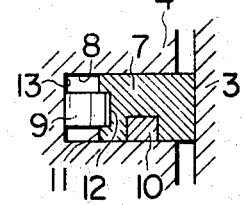

In FIGS. 4 to 7, as this invention is constituted as mentioned in the foregoing lines, even if the rotary piston 4 rotates in the direction of arrow A and the annular oil seal ring 7 tends to be forced by the friction caused by the side housing 3 to rotate in the direction shown by arrow B, it is rotated in the direction of arrow A, that is, together with the rotary piston 4 by the elastic force in the circumferential direction of the spring 9 due to the rotation of the rotary piston 4. In this case, even if shock in the circumferential direction works on the annular oil seal ring 7, the spring 9 reflects radially and the shock is absorbed by its radial deflection. By the deflection of the spring 9, slippage in the circumferential direction occurs between the annular oil seal ring 7 and the oil seal groove; however, the slippage is so small that it does not adversely affect the inner or outer circumference of the O-ring 10 and the annular oil seal ring 7. And, according to the deflection of the spring 9 in the circumferential direction caused by the load working on the annular oil seal ring 7 in the direction of arrow B, the elastic force of the spring 9 in the axial direction changes, and whether increasing or reducing the strength of the elastic force due to the deflection, it can be freely chosen by changing the method of securing the end of the spring 9 against the rotating direction of the rotary piston 4. That is, if the spring 9 is fitted so as to be compressed by the revolution of the rotary piston 4 as shown in FIG. 4, the elastic force of the spring 9 is increased by the deflection; and, if the spring 9 is fitted so as to be extended in the circumferential direction by the revolution of the rotary piston 4 as shown in FIG. 5, the elastic force of the spring 9 is reduced by the deflection. Therefore, as to whether spring 9 should be secured as shown in FIG. 4 or in FIG. 5, this is determined depending on requirements that will change according to the shape of the lip portion of the annular oil seal ring 7, the material of the annular oil seal ring 7 and the side housing, and the shape and the characteristics of the spring 9.

Figure 8:
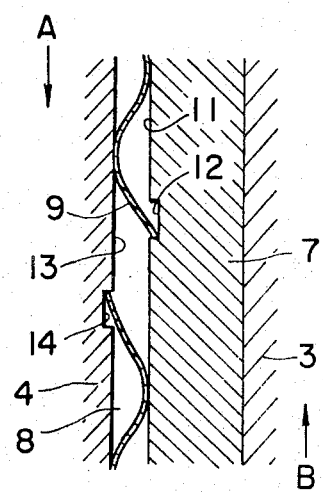
FIG. 8 is a view of another practical example of this invention corresponding to that of FIG. 4.

As shown in FIG. 8, the fastening or catching radial slots 12 and 14 may be formed in a groove of constant depth and of adequate width in the circumferential direction. A plurality of the fastening or catching slots 12 and 14 can be provided along the ring 7 and the groove 8 at proper intervals, respectively.

Figure 9:
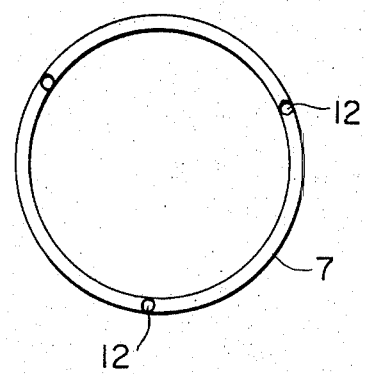
FIG. 9 is a front view of the rear side of the oil seal ring shown in FIG. 8.
Figure 10:
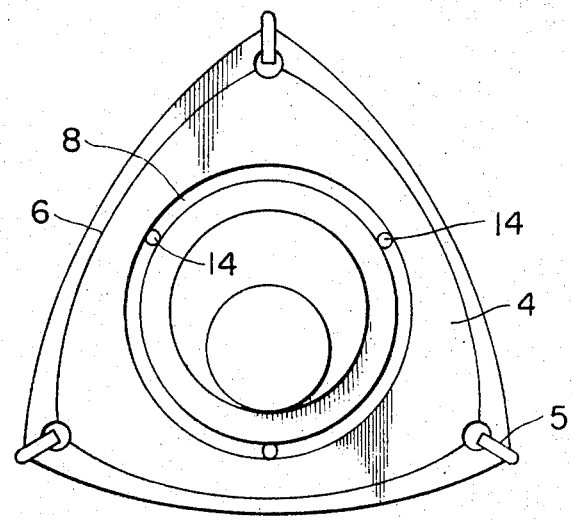
FIG. 10 is a front view of the rotary piston corresponding to the oil seal ring shown in FIG. 9.

As shown in FIGS. 9 and 10, the fastening or catching recesses 12 and 14 may be formed in a cylindrical hole.

Figure 11:
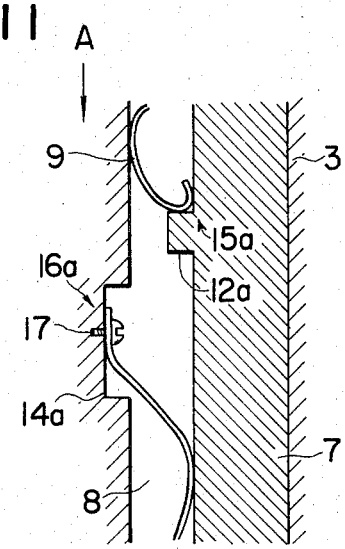
FIGS. 11 to 13 are views of other practical examples of this invention corresponding to that of FIG. 4.
Figure 12:
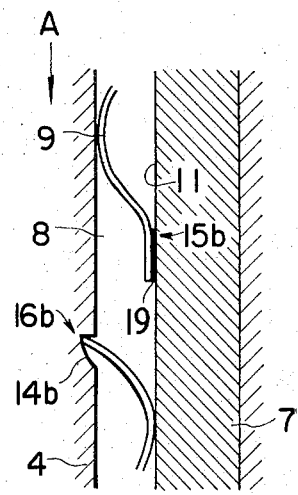
Figure 13:
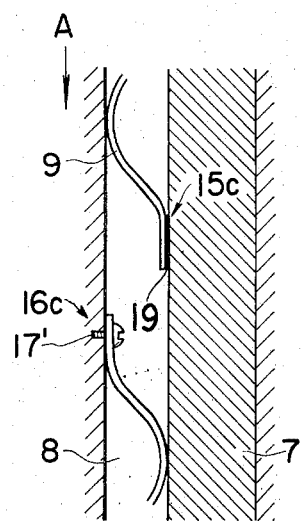

FIGS. 11 – 13 show other practical examples of the invention. The embodiments of FIGS. 11 – 13 also achieve the effect of this invention as that of FIGS. 4 and 5.

As shown in FIG. 11, a fixing device 16a comprises a fixing screw 17 for fixing the spring 9 to the oil seal groove 8. The spring 9 is fixed to a hole 14a provided in the oil seal groove 8 by the catch screw 17. A fixing device 15a comprises a projection 12a for fixing the spring 9 relative to the oil seal ring 7.

As shown in FIG. 12, a fixing device 16b comprises a notch or radial slot 14b provided in the oil seal groove 8. One end of the spring 9 is engaged by the catching notch 14b. Another end of the spring 9 is fixed to the oil seal ring 7 by a fixing. Another end of 15b is the form of adhesive 19.

As shown in FIG. 13, the spring 9 is fixed to the oil seal groove 8 by a screw 17' forming fixing device 16c and to the oil seal ring 7 by a device 15c including adhesive 19.

As shown in FIGS. 12 and 13, in case the spring 9 is fixed to the oil seal ring 7 by adhering means, the brazing it with brass, silver, etc. or the fitting it with resin of epoxide or polyamide family is appropriate as means for fitting or adhering it; in view of durability and heat resistance. Also, in the same case, since it may not be provided with a recess of a projection on the oil seal ring 7, this device maintains the oil sealing effect for a long period of time without damaging the oil seal ring 7 owing to the impact force.

As mentioned above, in order to elastically fasten the oil seal ring to the rotary piston through the spring, the spring 9 may be fixed or engaged to both of the oil seal groove 8 and the oil seal ring 7 or may be fixed to one of the oil seal groove 8 and the oil seal ring 7 and engaged to the other. The spring 9 in each case when relaxed has an axial dimension in excess to the gap between seal ring 7 and the axial face of the groove 8, with seal 7 in contact with the casing side wall.

A screw, bolt or rivet means or adhesive material may be used as fixing means, and a projection or recess of the oil seal ring and oil seal groove may be adapted to engaging means.

As is made clear through the explanation in the foregoing lines, since this device is made so that it can virtually prevent the relative slippage between the annular oil seal ring and the rotary piston in the circumferential direction which stresses the oil seal ring axially against the annular oil seal ring and the rotary piston respectively, and also it is made to absorb the shock working on the annular oil seal ring by making use of the elasticity of the spring, it does not only prevent the abrasion of the annular oil seal ring in the circumferential direction and of the O-ring but also prevents the annular oil seal ring from breaking, resulting in preserving the superior sealing characteristics for a long period of time.

What is claimed is:

1. In a rotary piston internal combustion engine having a multiapexed rotary piston rotating planetarily about an axis in a casing formed with a center housing having a trochoidal inner peripheral surface and side housings provided on both sides of said center housing forming axial thrust surfaces for said piston, a ring-shaped oil seal groove formed within at least one side of said piston and axially facing a respective side housing thrust surface, an oil seal ring within said groove having a sliding face in contact with said housing thrust surface at the axially outer side thereof, an annular spring being wavy at its circumferential direction positioned within said groove and between said oil seal ring and said piston for pressing said oil seal ring into contact with the thrust surface of the respective side housing for the purpose of maintaining an oil seal between said piston and said thrust surface of said housing during said rotary planetary movement of said piston, the improvement comprising:

first means for fixing one portion of said spring to said piston within said oil groove, and second means for fixing another portion of said spring within said groove to said oil seal ring, wherein, when said rotary piston rotates, said oil seal ring is elastically coupled to said rotary piston through said spring so that said oil seal ring rotates in unison with said rotary piston and does not rotate within said oil seal groove.

2. The rotary piston internal combustion engine as claimed in claim 1, wherein the axial dimension of said wavy spring when relaxed is greater than the distance existing between the face of the oil seal ring opposite to the sliding face and the axial face of said annular groove, such that the spring is compressed therebetween.

3. The rotary piston internal combustion engine as claimed in claim 1, wherein said wavy spring is split and includes at least two separate contact portions intermediate of the ends, said contact portions being in respective contact with the axial surface of said groove and the face of said oil seal ring opposite to said sliding face.

4. The rotary piston internal combustion engine as claimed in claim 1, wherein said spring is split and at least one of said fixing means comprises a screw extending through one end of said wavy spring and threadably coupled to the side of said piston, and said other fixing means comprises a projection extending axially outward of the first surface of said oil seal ring facing the axially inward surface of said groove and the other end of said annular wavy spring abuts said projection and is spring biased against the same by the resiliency of said spring.

5. The rotary piston internal combustion engine as claimed in claim 1, wherein at least one of said fixing means comprises an adhesive adhering a portion of said spring to the surface of said oil seal ring opposite to said sliding face.

6. The rotary piston internal combustion engine as claimed in claim 1, wherein said first fixing means comprises a radially directed recess within the axial face of said ring-shaped oil seal groove and said annular spring is split and has one terminal end received within said recess and secured therein by the resilience of the spring.

7. The rotary piston internal combustion engine as claimed in claim 6, wherein said second fixing means comprises at least one radial recess provided on the face of the oil seal ring opposite to said sliding face and said spring terminates with its other end received therein and is maintained by the resiliency of the spring.

8. The rotary piston internal combustion engine as claimed in claim 1, wherein said first fixing means comprises a cylindrical recess provided on the axial face of said oil seal groove and said annular spring is split and terminates with one end received within said cylindrical recess and is maintained therein by the resiliency of said spring.

9. The rotary piston internal combustion engine as claimed in claim 8, wherein said second fixing means comprises at least one cylindrical recess provided on the face of the oil seal ring opposite to said sliding face and said spring terminates with said other end thereof received within said cylindrical recess and is maintained therein by the resiliency of said spring.

* * * * *